US008880883B2

(12) United States Patent
Dubey et al.

(10) Patent No.: US 8,880,883 B2
(45) Date of Patent: Nov. 4, 2014

(54) SECURE END-TO-END PERMITTING SYSTEM FOR DEVICE OPERATIONS

(71) Applicant: Silver Spring Networks, Inc., Redwood City, CA (US)

(72) Inventors: Aditi Dubey, Redwood City, CA (US); Benjamin N. Damm, San Francisco, CA (US); Michael StJohns, Germantown, MD (US); Raj Vaswani, Portola Valley, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 49 days.

(21) Appl. No.: 13/843,156

(22) Filed: Mar. 15, 2013

(65) Prior Publication Data

US 2014/0281528 A1    Sep. 18, 2014

(51) Int. Cl.
*H04L 9/32*    (2006.01)
*G06F 21/60*    (2013.01)
*H04L 29/08*    (2006.01)

(52) U.S. Cl.
CPC .............. G06F 21/602 (2013.01); H04L 67/10 (2013.01)
USPC ........................................................ 713/168

(58) Field of Classification Search
USPC ................ 713/168, 170, 172; 726/1, 4, 9, 17
See application file for complete search history.

(56) References Cited

U.S. PATENT DOCUMENTS

| | | | |
|---|---|---|---|
| 7,770,789 B2 | 8/2010 | Oder, II et al. | |
| 8,321,915 B1 | 11/2012 | Bartolucci et al. | |
| 8,498,941 B2 * | 7/2013 | Felsher | 705/51 |
| 8,701,209 B2 * | 4/2014 | Awata | 726/30 |
| 2002/0108046 A1 | 8/2002 | Armingaud | |
| 2008/0222714 A1 | 9/2008 | Wahl | |
| 2010/0044433 A1 | 2/2010 | Wankmueller et al. | |
| 2010/0275016 A1 | 10/2010 | Zimmer et al. | |
| 2012/0078548 A1 | 3/2012 | Salazar et al. | |
| 2012/0116602 A1 | 5/2012 | Vaswani et al. | |

FOREIGN PATENT DOCUMENTS

WO    2010/096923 A1    9/2010

OTHER PUBLICATIONS

Notification of Transmittal of the International Search Report (Forms PCT/ISA/220 and PCT/ISA/210) and the Written Opinion of the International Searching Authority (Form PCT/ISA/237) issued on May 22, 2014, by the European Patent Office in corresponding International Application No. PCT/US2014/018968. (12 pages).

(Continued)

*Primary Examiner* — Beemnet Dada
(74) *Attorney, Agent, or Firm* — Buchanan Ingersoll & Rooney PC

(57) ABSTRACT

A permitting system for controlling devices in a system includes a permit issuing agent that receives a command to be sent to a device. Based upon at least one attribute of the command, the permit issuing agent identifies one or more business logic modules that is pertinent to the command. Each business logic module has a respectively different set of business rules associated with it. Each identified business logic module determines whether the command complies with the business rules associated with that module. If the command is determined to comply with the business rules of all of the identified business logic modules, the agent issues a permit for the command, and the permit is sent to the device for execution of the command.

26 Claims, 6 Drawing Sheets

(56) References Cited

OTHER PUBLICATIONS

Notification of Transmittal of the International Search Report (Forms PCT/ISA/220 and PCT/ISA/210) and the Written Opinion of the International Searching Authority (Form PCT/ISA/237) issued on Apr. 18, 2012, by the Korean Intellectual Property Office in corresponding International Application No. PCT/US2011/055705. (9 pages).

Office Action issued by the U.S. Patent and Trademark Office in the U.S. Appl. No. 12/939,702, mailed May 7, 2013, U.S. Patent and Trademark Office, Alexandria, VA. (18 pages).

* cited by examiner

SECURE END-TO-END PERMITTING SYSTEM FOR DEVICE OPERATIONS

TECHNICAL FIELD

This disclosure pertains to the issuance of commands for operations to be performed by devices in a system, such as nodes in a network, and more particularly to secure end-to-end authentication and authorization of the commands issued to the devices within the system.

BACKGROUND

There are a variety of different types of systems in which commands are issued to devices within the system to perform operations, and in which the proper authorization for the issued command, and the authentication of that command's issuer, are paramount to the proper operation of the system. One example of such a system is an energy distribution network. The operational models for such systems can vary, and a number of different parties may exercise authority over different sets of control commands and messages sent to different entities in the network. If an unauthorized command is sent to a device in the network, e.g., instructing a distribution transformer to change its output voltage at a time when the load on the distribution grid cannot accommodate the change, the grid could become unstable and incur outages and/or damage. In another aspect, an unauthorized command to replenish a pay-as-you-go meter could result in theft of the energy resource being distributed via the network. Accordingly, commands issued to the devices should comply with business policies that are designed to prevent such occurrences, and the authentication of commands should be verified at the devices before implementing commanded operations.

Of course, systems other than energy distribution networks have similar types of security concerns. For instance, an enterprise's information technology system may need to protect the configuration of its routers and other network components, even in cases where individual persons have physical access to the components and may be able to enter commands directly into them.

One example of a system that ensures security of commands issued to devices is disclosed in U.S. application Ser. No. 12/939,702, filed Nov. 4, 2010. The disclosed system includes an agent, such as a hardware security module, that implements permitting operations. When a control and/or management application has a command to be sent to a device, the command is first forwarded to the agent, where it is checked to determine whether it complies with policies designed to ensure proper operation of commanded devices. If the command complies, the agent signs the data pertaining to the command, and optionally also encrypts it. The agent then issues a permit containing the signed command data. This permit is transmitted to the device, for execution of the commanded operation.

In a complex system, such as an energy distribution network, a number of responsible parties exercise authority over different sets of control commands and messages that are sent to different entities in the network. Thus, in dependence upon the party issuing the command, and the entity to which the command is sent, different sets of business logic may need to be consulted in order to confirm that the command, and the issuing party, conform to established policies. Over time, some of the business logic may need to be updated to accommodate changes in the configuration of the system, new issuing authorities, and/or other factors that can vary. Accordingly, it is desirable to provide a flexible permit system that can accept permit requests from a variety of sources via a well-defined interface, with configurable rules for each type of source, or each issuance of a permit. In addition, the business logic embodied in the configurable rules should be able to address a wide variety of applications, while ensuring the necessary security of the issued commands.

SUMMARY

A permitting system for controlling devices in a system includes a permit issuing agent that receives a command to be sent to a device. Based upon at least one attribute of the command, the permit issuing agent identifies one or more business logic modules that are pertinent to the command. Each business logic module has a respectively different set of business rules associated with it. Each business logic module identified by the agent for a given command determines whether the command complies with the business rules associated with that module. If the command is determined to comply with the business rules of all of the identified business logic modules, the agent issues a permit for the command, and the permit is sent to the device for execution of the command.

Upon receipt of the permit, the device examines the permit to verify that the command was issued by an authorized source, and whether the permit is valid. If so, it executes the command and returns a signed reply to confirm the execution. In one embodiment, the reply is signed by the device itself that executed the command, rather than an communication module associated with the device, to thereby provide complete end-to-end security for commands and other communications that are exchanged between a system back office and devices in the system.

DETAILED DESCRIPTION

To facilitate an understanding of the principles upon which the present invention is based, practical examples of its implementation are described hereinafter with reference to the secure control of commands issued to devices in an electric power distribution system. It will be appreciated, however, that such examples are not the only practical applications of these principles. Rather, they can be employed in any type of system in which critical commands have the potential to severely disrupt or damage the system, if such commands are improperly or erroneously issued. Likewise, they can be used in conjunction with all commands and control messages sent to a critical component of a system, whose proper operation is essential at all times.

Figure 1:
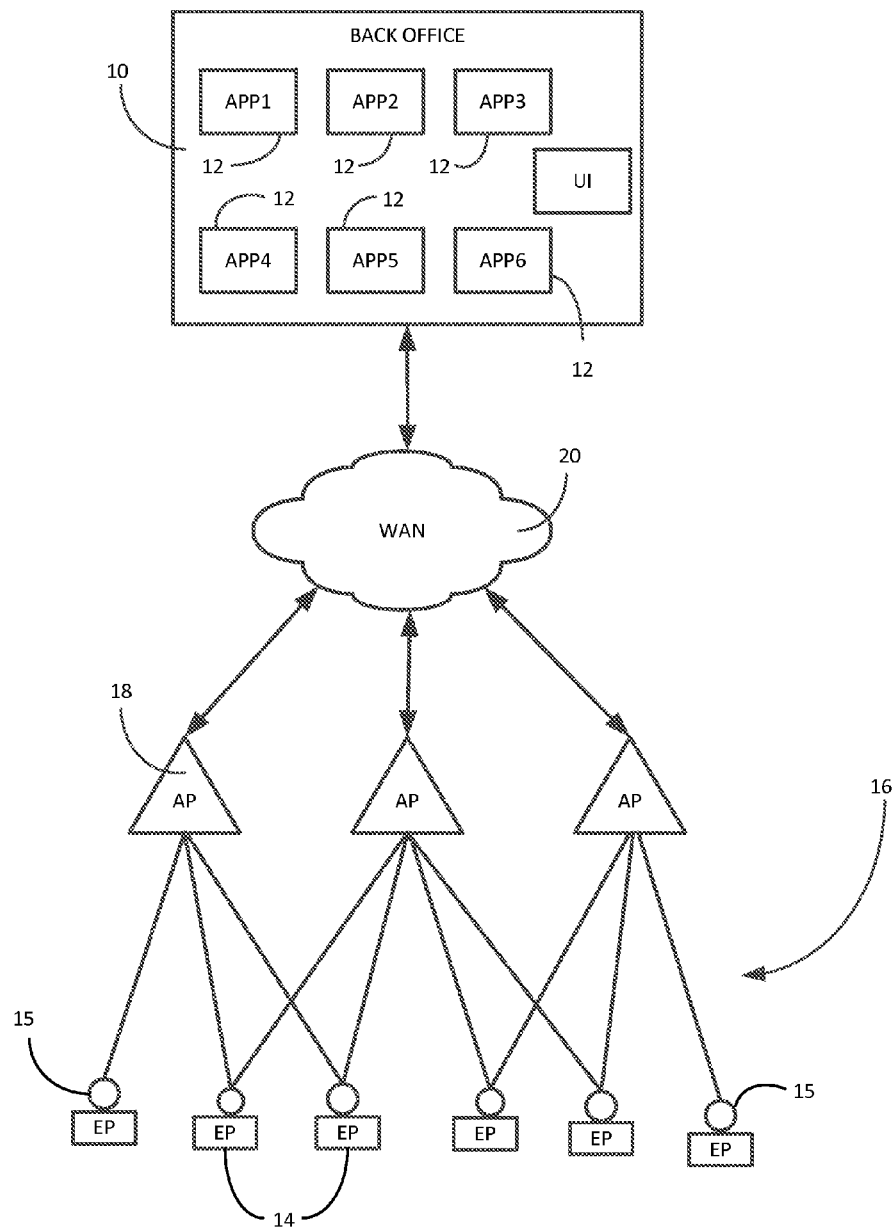
FIG. 1 is a schematic illustration of an exemplary system in which the principles of the invention can be implemented.

FIG. 1 illustrates an example of one type of management and control system in which the principles of the invention can be implemented. The back office 10 of the system comprises a number of individual subsystems, or applications 12, associated with various operations of the overall system. Each application may be associated with particular operations that are performed within the system, and/or control a subset of the devices that constitute the system. In the case of an energy distribution network, for example, the applications 12 might include a customer information system, a customer relations module, an outage management system, a billing system, a grid stability module, and a user interface. For other types of systems, different sets of applications may be implemented in the back office.

At least some of these applications may have the ability to communicate with devices connected to the back office via a network. For example, some of the applications may communicate with individual endpoint devices 14. In the case of an energy distribution system, for example, some of these endpoint devices might be utility meters that obtain consumption data at individual customers' premises, and communicate with the back office 10 for billing purposes, to provide notification of outages and other abnormal conditions, and for various system management purposes. Other endpoint devices might be equipment in the distribution network, such as substations and transformers, that provide status information and notifications. Each endpoint device is associated with a communications module 15, e.g. a network interface card, that enables messages to be transmitted to and from the device. More than one device can be associated with a given communications module.

The endpoint devices can communicate with the back office, via their associated communications modules, through a local area network 16 having access points 18 that provide egress into and out of the network. The local area network can be a wired network, a wireless network, e.g., a mesh network, or a combination of the two. The access points 18 can communicate with servers at the back office 10 by means of a wide area network 20, or one or more dedicated communication links.

In a system of this type, one issue of concern is the secure management of commands that are issued to the devices, as well as information returned from the devices. Malicious and/or erroneously issued commands may have the potential to disrupt the operation of the system. To limit such possibilities, efforts should be made to ensure that command and control operations take place in a secure manner, and only by entities that are authorized to undertake such operations. However, since the back office of the system may consist of a variety of interconnected systems, enforcement of security becomes difficult. Many different groups may need to access all or part of the software system, which complicates the ability to limit logical and/or physical access to individual subsystems.

Figure 2A:
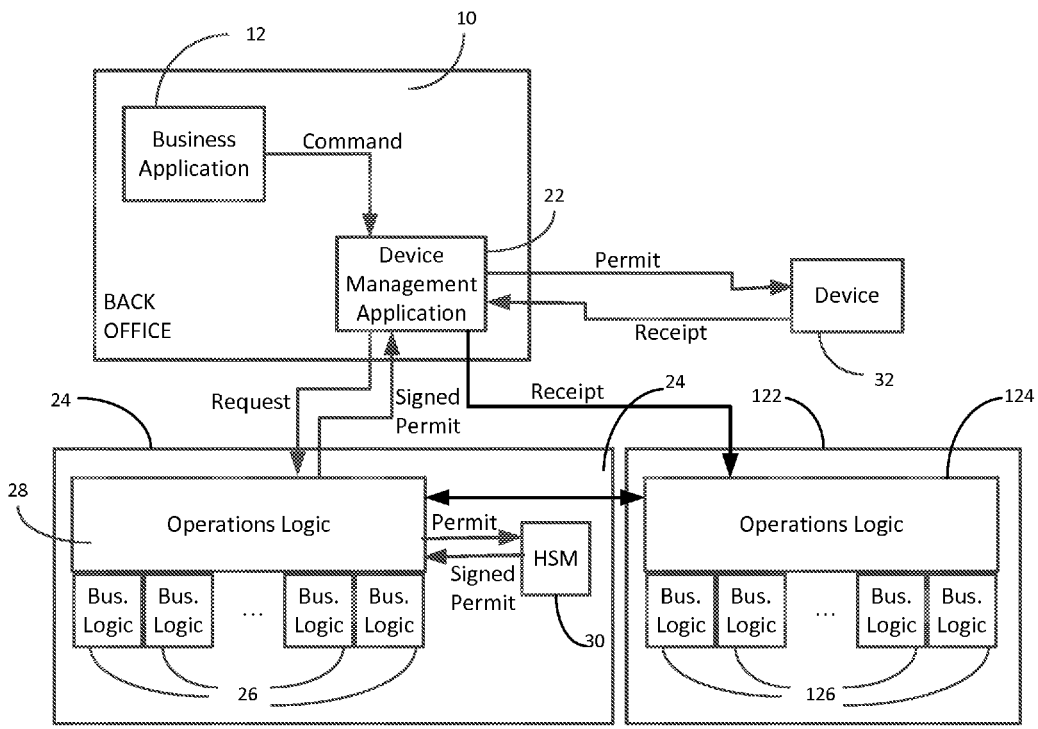
FIG. 2A is a block diagram of a system and procedure for issuing permits for commands.

To provide end-to-end security in such a system, a permitting mechanism is employed to authorize commands that are to be issued to devices within the system, as well as authenticate the issuers of those commands. One example of an arrangement and procedure for issuing permits is illustrated in FIG. 2A. In this example, one of the business applications 12 in the back office 10 issues a command for a particular device, or group of devices, in the system to perform an operation. Upon receipt of this command, a device management application 22 may schedule the operation to be performed, and then determines if the operation requires a permit. If so, it sends the command to a permit issuing agent 24 over a secure link, requesting permission to send the command to the device(s). The permit issuing agent can be implemented within a server located at the back office 10, or may be a discrete device. The interface between the permit issuing agent and the back office applications can be a secure or proprietary network protocol, a programmatic connection (e.g., a local call from the application requesting a permit), an email, or similar type of message.

Figure 2B:
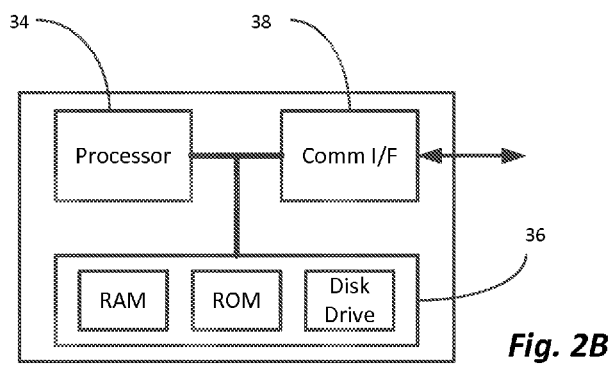
FIG. 2B is a block diagram of one embodiment of the hardware implementation of the permit issuing agent.

The components of the permit issuing agent (discussed hereinafter) may be part of a single managed device, multiple individual devices that communicate with one another, or a combination of both implementations. Referring to FIG. 2B, the permit issuing agent is constituted by at least a processor 34, one or more forms of memory 36 constituted by tangible storage media, e.g. RAM, ROM, flash memory, magnetic and/or optical disk, etc., and a communications interface 38. The memory 36 stores program instructions that are executed by the processor to carry out permitting operations, as described hereinafter. The memory also stores the business logic that is consulted to determine whether a permit can be issued. The memory that stores the business modules can be integrated within the device that implements the permit issuing agent, or be remotely accessible by the processor, e.g. over a network via the communications interface 38. The processor interacts 34 with the communications interface 38 to receive requests for permits from external sources, and to transmit responses to the requestors, or other external resources, as appropriate.

The permit issuing agent includes, or is in communication with, a plurality of business logic modules 26 that are respectively associated with different applications of the business logic. In one embodiment, each business logic module is implemented as a plug-in that is stored in the memory of the permit issuing agent. By means of such an implementation, the business logic for one particular application can be easily updated, through replacement of the plug-in associated with that application, without having to reconfigure the entire permit issuing agent, and without affecting the business logic for any of the other applications.

The business logic that is implemented via the business logic modules 26 can address a wide variety of applications, each of which may have specific and pertinent policies. A given command may be relevant to some of those policies, but not necessarily all of them. To this end, the permit issuing agent includes operations logic 28 that has overall responsibility for the secure issuance of permits. It determines, for each requested permit, which business logic modules 26 need to be consulted. When a permit is requested for a given command, the operations logic consults a configuration table, to determine which policies are impacted by that command, and queries one of more of the business logic modules 26 that pertain to those policies.

For example, a business application in a power distribution system may issue a command to disconnect a customer or load from the distribution network. One of the business policies may limit the number of connections and disconnections that can be carried out within a given time frame, for instance, a maximum of 10 disconnections per hour. Accordingly, the operations logic queries a rate limiting business logic module, to determine whether the requested disconnection is authorized under that constraint. Another business logic module may be associated with regulatory limits, which only allow disconnections to occur during certain times of the year, and/or certain times of the day. Yet another business logic module may be responsible for monitoring the power grid, and only permit disconnections if the overall system load is above a predetermined threshold. In response to a request to issue a permit for a disconnection command, therefore, the operations logic determines that each of these three business logic modules is pertinent to the command, and queries them to ascertain whether the requested command is authorized under the respective policies that they implement.

The determination of the particular business logic modules 26 to query can be based upon one or more attributes of the command. These attributes can include (i) the entity that issued the command, e.g. the particular business application 12 from which the command originated, and/or the particular user of that application, (ii) the particular type of operation being commanded, and (iii) the device to which the command is to be sent.

An example of pseudocode is shown below that describes an operation associated with the issuance of a permit. In this example, the command is for the disconnection of a load, e.g. a customer's premises, in an electric power distribution system.

```
<operation command="disconnect">
  <authorization scope="systemwide">
    <or>
      <operator authrequired="yes" level="systemadmin"/>
      <and>
        <operator authrequired="yes" level="systemop"/>
        <permit entity="RemoteDisconnectPermitter">
          <and>
            <ratemodule rate="1500" unitper="4 hours"
                refreshtick="5 minutes"/>
            <ratemodule rate="5000" unitper="1 day"
                refreshtick="30 minutes"/>
            <powermodule rate="1mw" unitper="1 hour"
                refreshtick="1 minute"
                branch="neighborhood"/>
            <weathermodule mintemp="40"/>
          </and>
        </permit>
      </and>
    </or>
  </authorization>
</operation>
```

The top level of the command describes the operational logic in terms of required authorizations. The permit section describes the permitting system and business logics that must be consulted to approve the issuance of a permit.

In this example, a system level administrator may do a disconnect at any time. A manual disconnect requires a normal operator authorization. In that case, it must not have more than 1500 disconnects per hour, nor more than 5000 disconnects per day, and must not occur if the season is winter and the low temperature predicted for the following night is 40 degrees or less. In addition, any given neighborhood branch may not shed more than 1 MW per hour. These latter four conditions are enforced by the permitting system.

In particular, the operations logic consults a rate module, a power module, and a weather module. The rate module keeps track of commanded disconnects, and determines if at least 1500 disconnects have occurred in the last hour. It also determines if at least 5000 disconnects have occurred within the last 24 hours. If either of these conditions exist, it rejects the permit. The power module keeps track of the amount of load that has been shed in each neighborhood branch over a period of time. If more than 1 MW has been shed in the neighborhood branch of interest within the last hour, it rejects the permit. The weather module is regularly updated with current and forecasted weather conditions, to implement policies pertaining to various commands. In this case, if the temperature is below 40 degrees, or predicted to fall below that value within the next 24 hours, a disconnect is not permitted.

In some embodiments, the devices may be classified into different groups. Based upon the particular group to which a device belongs, the operations logic may select a business logic module that pertains to that particular group. Alternatively, the operations logic may send all commands of a particular type to the same business logic for authorization, regardless of device group, and the business logic module may decide whether a device in a given group is permitted to perform the commanded operation.

If any of the queried business logic modules indicates that the requested command is not authorized, because it violates one of the policies that it implements, the request for a permit is refused. For instance, in the example given above, if 1500 disconnections have already been authorized within the last hour, the rate limiting module would provide a negative response to a request for another disconnection. In that case, no permit is issued, even if the other business logic modules provide an affirmative response. Conversely, if all of the business logic modules that are queried by the operations logic indicate that the requested command is authorized, the operations logic generates and forwards a permit containing the command to a hardware security module 30. The hardware security module signs the permit, using a private key that is associated with the permit issuing agent 24, so that it can be subsequently authenticated by a device that receives it. The signed permit is then returned to the operations logic, to be forwarded to the device management application 22.

Figure 3:
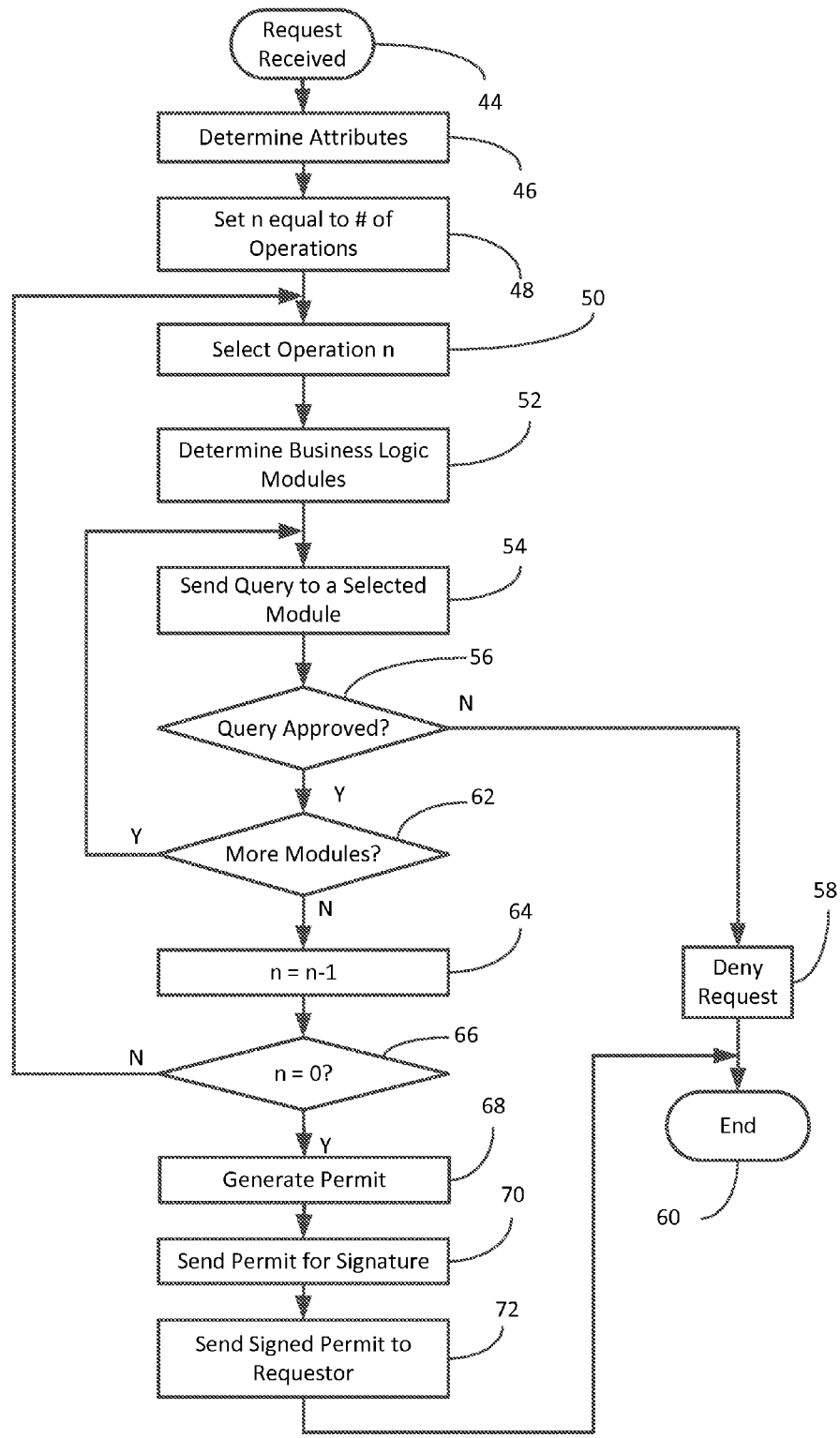
FIG. 3 is a flowchart depicting an exemplary algorithm for the operation of the operations logic of the permit issuing agent.

FIG. 3 is a flowchart of an exemplary procedure that is performed by the operations logic 28. This procedure is carried out by the processor that implements the operations logic, in accordance with program instructions stored in associated memory. The procedure is initiated at step 44 when a request to issue a permit is received. In response, the request is first analyzed at step 46 to determine the values of its attributes, e.g. command issuer, targeted device(s), commanded operation(s), device group, etc. At step 48, an index n is set to a value equal to the number of individual operations, to be performed by the device(s), that are contained in the request. The operations logic then selects one of the operations in the request, e.g. the $n^{th}$ operation, at step 50. Based on one or more attributes of the request, at step 52 the operations logic determines which business logic module, or modules, are pertinent to that operation.

At step 54, the operations logic selects one of the business logic modules that has been determined to be pertinent, and sends a query to that module, forwarding the selected operation and any other information relevant thereto, e.g. the issuer of the command, and/or the target device. Upon receipt of a response from the queried business logic module, the operations logic determines at step 56 whether the request for a permit was approved by that module. If not, at step 58 the operations logic sends a message to the requester, e.g. the device management application 22, indicating that the permit is denied. At that point, the procedure ends, at step 60.

If the selected business logic module returns a response indicating that the request is approved, at step 62 the operations logic assesses whether any other business logic modules were identified at step 52 that need to be queried. If so, the procedure returns to step 54, and another one of the identified modules is queried. Steps 54-62 are repeated in an iterative manner until all of the identified business logic modules have been queried, or until any of the queried modules responds with a denial of the requested permit.

Once all of the identified business logic modules have been queried and each returns an approval for the permit, the operations logic proceed to steps 64 and 66, where it decrements the index n and then determines if n is equal to zero. If it is not, that means there are additional operations to be evaluated, and the procedure returns to step 50, where the next operation is selected. Steps 52-66 are then repeated, until all of the operations in the request have been evaluated relative to the appropriate business logic modules, and approved. At any point along the way, if a single business logic module denies the request, the requestor is notified of the denial at step 58, and the procedure ends.

If there are no more operations to be evaluated at step 66, and all of the queried business logic modules have approved all of the requested operations, a permit is generated at step 68. The permit is then forwarded to the hardware security module at step 70, to be signed. Upon receipt of the signed permit, the operations logic returns it to the requestor, at step 72, and the procedure ends. A copy of the permit can be stored at the permit issuing agent, for audit purposes.

Returning to FIG. 2, upon receiving the signed permit, the requestor, e.g. device management application 22, sends a packet containing the permit to a device 32 designated by the business application 12, to perform the commanded operation. The device can verify the permit, for example, by following a chain of certificates from the permit, through the permit issuing agent's credentials, to a root authority associated with the overall system. The device may also verify that any time values pertaining to the validity of the permit are consistent with the current time. If all information is correct and verified, the device can execute the command and send a signed receipt to the device management application, indicating completion of the command.

The device management application can also sign the payload of the packet that is sent to the node, to provide two separate authorizations for the command that are provided by different control entities, namely the device management application and the permit issuing agent. Both forms of authorization need to be verified by the device before it executes the command. In this example, the permit issuing agent does not possess the credentials needed to communicate directly with the device. Rather, it provides credentials to another control entity, in this case the device management application, for presentation of the authorized command to the device.

Figure 4A:
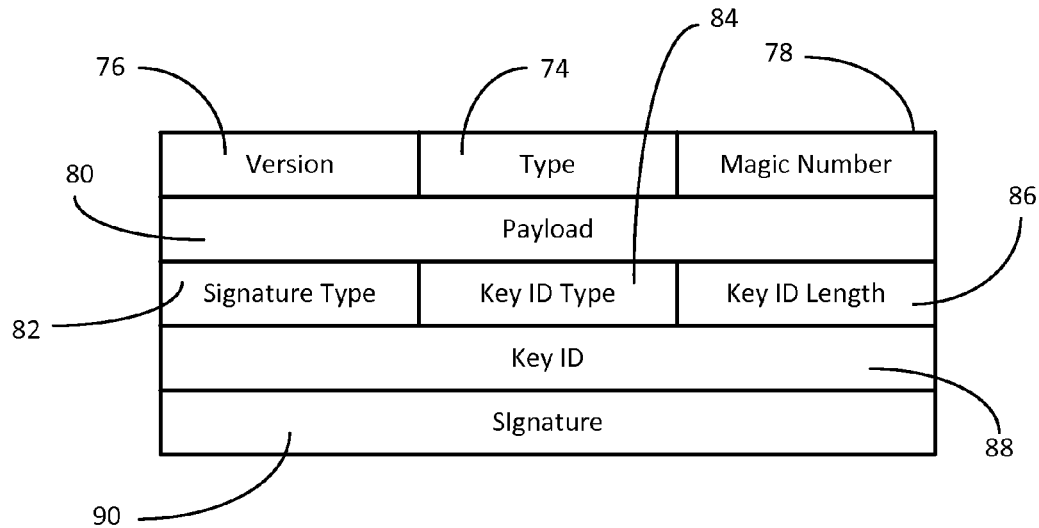
FIG. 4A is a block diagram of an exemplary format for a signature wrapper.

An exemplary format for a signature wrapper for the signed permit is illustrated in FIG. 4A. A type field 74 identifies the type of payload that is encoded, e.g. a permit payload. The values in a version field 76, the type field 74, and a magic number field 78 positively identify a specific kind of signed object. The payload 80 can be a permit or a receipt, for example. A signature type field 82 identifies the kind of signature algorithm that is used. The key ID type 84 and key ID length 86 encode the identifier for the signature, and the key ID 88 is the actual identifier, e.g. a certificate subject name. The signature field 90 contains the actual encoded signature, whose format is indicated by the signature type 82.

Figure 4B:
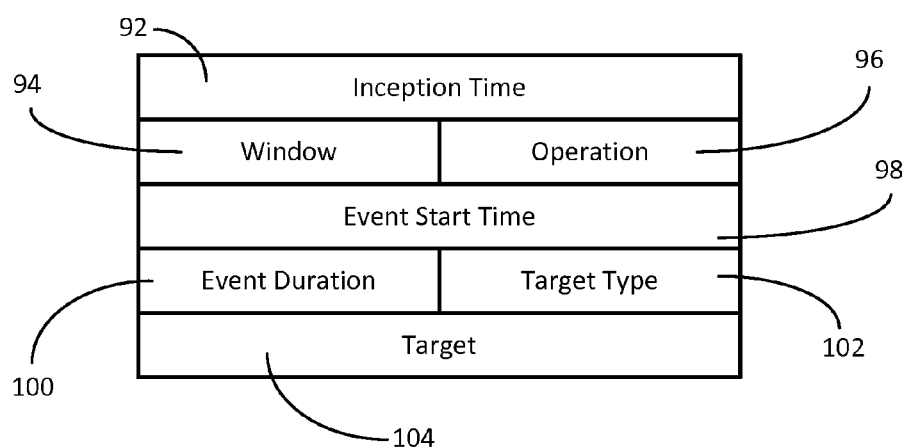
FIG. 4B is a block diagram of an exemplary format for a permit payload.

FIG. 4B depicts an exemplary format for a permit, which can by one form of payload 80 in the signature wrapper of a message transmitted to a device. The first field 92 of the permit payload indicates an inception time, namely the time at which the permit becomes valid. When a message containing a permit payload is received at a node, the node compares the inception time to its current time. If the inception time is later than the current time, plus a predetermined increment, e.g. 5 minutes, the device rejects the permit as invalid.

The second field 94 of the permit payload indicates a duration window during which the permit remains valid. This field contains a value indicating the number of predetermined time intervals, e.g., 5-minute blocks, beyond the inception time that the permit is valid. If the current time at the device is greater than the permit inception time plus the product of the predetermined interval and the window value, the permit is rejected as invalid. For example, if the inception time is 1:00:00, the window value is 2, and the current time is 1:12:38, the permit will be rejected as having expired.

The next field 96 of the permit payload indicates the operation that is permitted to be carried out. Multiple operations can be associated with a single permit. The event start time field 98 and event duration field 100 are optional fields that can be used with certain types of operations, such as a load control event that may be carried out for a certain period of time. The event start time field 98 indicates when the event is to begin, and the event duration field 100 specifies how long the event is to be active.

The target type field 102 indicates the format for the target field 104 that follows. The target field 104 designates the device that is to perform the permitted operation. For example, the target could be the MAC address of the device. The target type field 102 indicates the format in which this address is expressed e.g., a DER octet string.

To further increase security, a constraint may be imposed that a command can only be issued to one device at a time. Before issuing a permit, the permit issuing agent may check to ensure that the target address for the device is associated with a single device, and is not a group or broadcast address.

Figure 5:
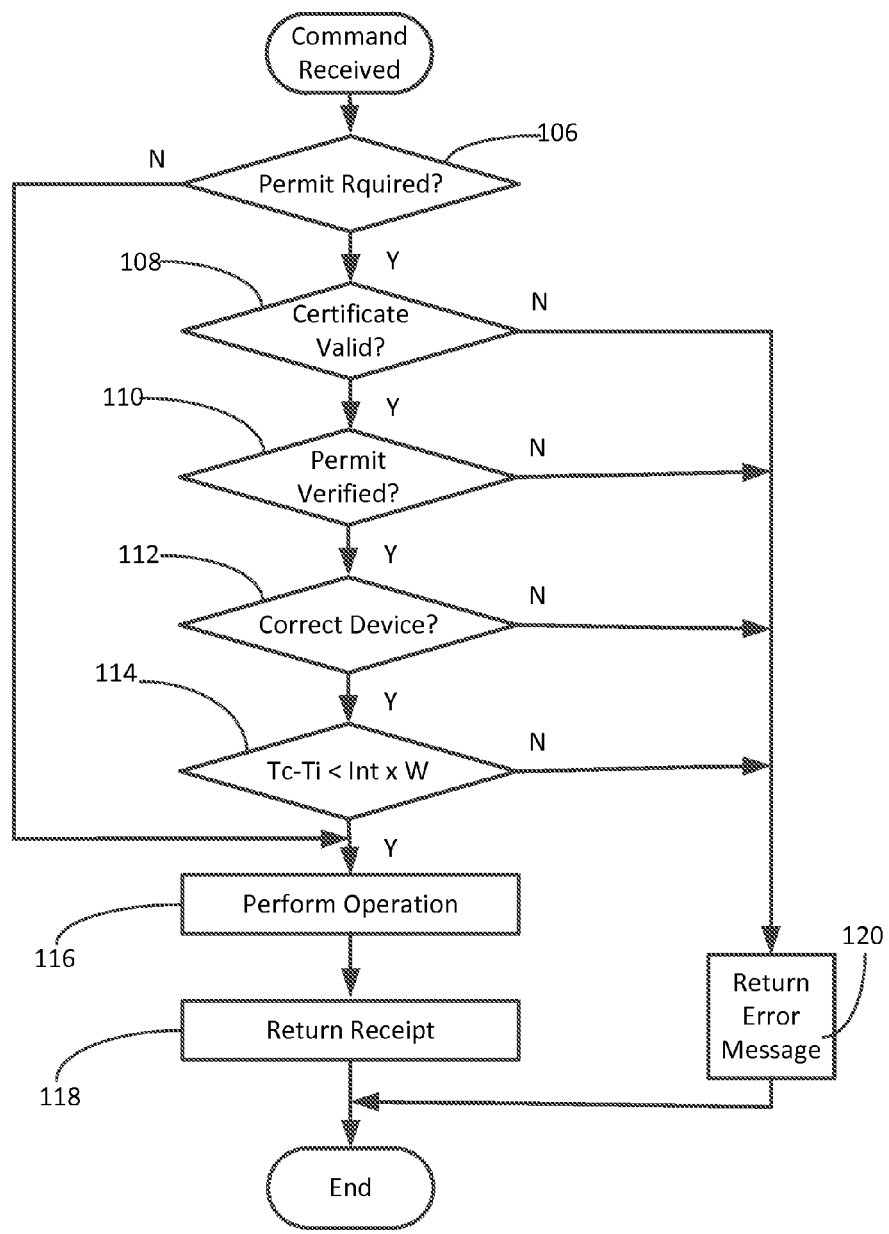
FIG. 5 is a flowchart depicting an exemplary algorithm for a verification procedure performed in a device upon receiving a command.

FIG. 5 is a flowchart of an exemplary procedure that can be performed at the device. Upon receiving a data packet containing a command to perform an operation, the device first checks to see whether the indicated operation requires a permit at step 106, based upon policies that are stored within the device. If no permit is required for the specified operation, the device proceeds to step 116, and performs the operation. If a permit is required, at step 108 the device confirms that the certificate and private key that were used to sign the permit have the necessary privileges to execute the requested operation, again based upon information stored in the device. If the confirmation is affirmative, at step 110 the device verifies the authenticity of the signed permit, as having been signed by the corresponding private key of the indicated certificate. The device then verifies that the target designation in the field 82 identifies that device, at step 112. Then, at step 114, the device determines if the difference between the current time Tc and the inception time T1 is less than the product of the predetermined interval Int and the window value W, to confirm that the permit has not expired. If all of the verification checks are successful, the commanded operation is executed at step 116, and a response is returned at step 118 to confirm successful execution. If any of the verification steps conducted by the device are not successful, the permit is rejected, and an error message is returned at step 120.

Upstream communications, from the device to the back office, are secured as well. In one form, the receipt that is returned to the device management application can be a copy of the permit that is signed, using a cryptographic identifier of the device. Alternatively, the signed receipt may comprise information that is derived from the permit, e.g. the commanded operation. In addition, the device may add log information to specify the operation that was performed, e.g., changing an output voltage from one value to another value, and the time at which it was performed, before signing and returning the receipt.

Conventionally, the signing of the receipt might be performed by a communications module 15, such as a network interface card, associated with the device 14 that executes the command. In such an arrangement, after executing the command, the device 14 may send reporting information to the communications module 15, and in response to receipt of this information, the communications module may prepare and sign the receipt, using credentials that are stored in the module.

In accordance with an embodiment, the security of the network communications is extended to the device, by having the device itself sign the reporting information before sending it to the communications module for transmission over the network. For this purpose, the device stores authentication credentials, e.g. a secret key and a certificate, with which the signature is created. In one implementation, the device may sign the reporting information, e.g. a meter reading, a voltage value, a changed state, etc., and forward that signed information to the communications module, which then prepares and transmits the receipt, based on that information. In another implementation, the device may prepare the complete signed receipt itself, in which case the communications module functions as a relay to transmit the signed receipt to the intended recipient. By means of such an embodiment, secure end-to-end transmissions are ensured between the back office (or other network node) and the ultimate endpoint device. Thus, attempts to spoof the system by sending rogue information from the device can be thwarted.

Figure 6:
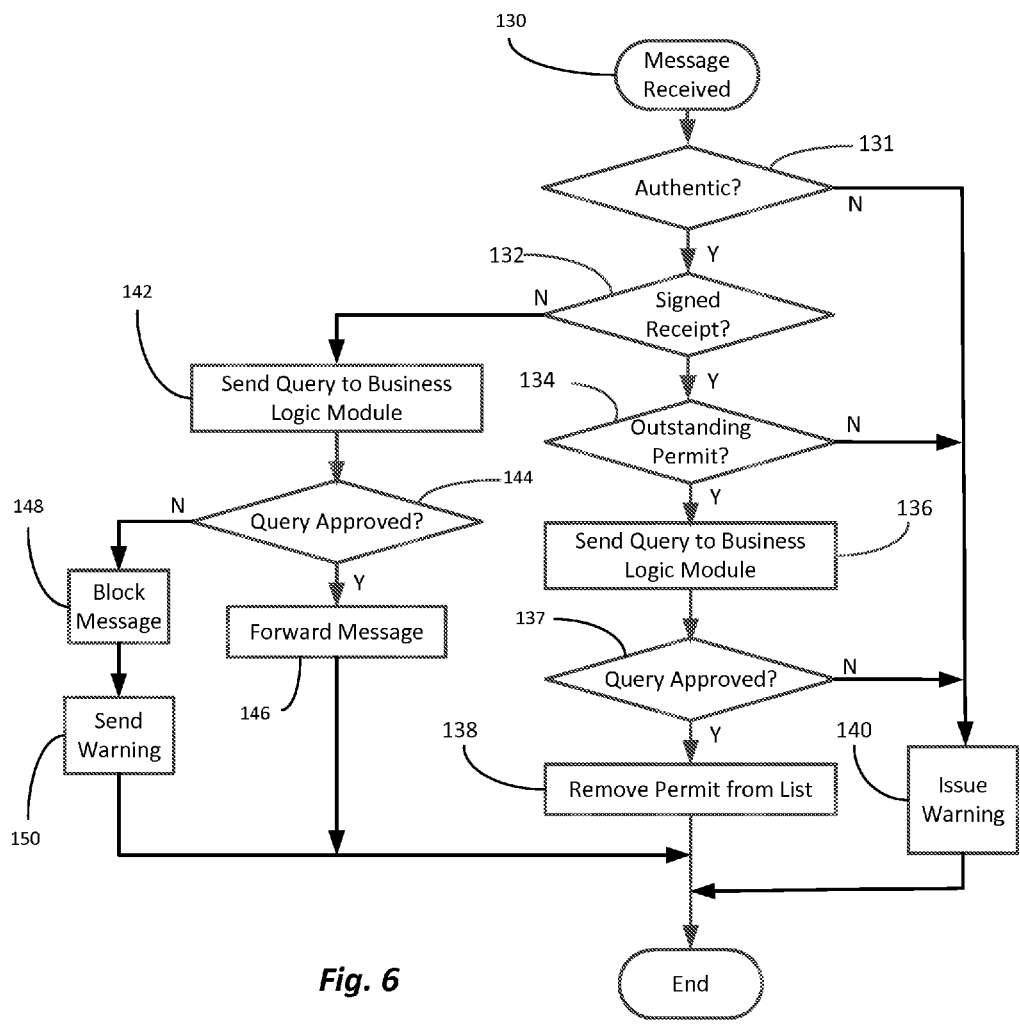
FIG. 6 is a flowchart depicting an exemplary algorithm for the operation of the operations logic of the response checking agent.

Returning to FIG. 2A, the back office includes a response checking agent 122 that analyzes the receipts, as well as other communications from the devices. Upon receiving a communication from a device, such as a signed receipt, the device management application 22 forwards it to the response checking agent 122. The response checking agent also has an operations logic 124, and one or more business logic modules 126, which it utilizes to analyze the communications received from the devices. The procedure implemented by the response checking agent, upon receiving a communication from a device, is depicted in the flowchart of FIG. 6.

Referring thereto, upon receiving a message from a device at step 130, the operations logic 124 first assesses at step 131 whether the communication is authentic, e.g. if it is signed by a recognized device. If so, at step 132 it determines whether the communication comprises a signed receipt. If so, since a receipt is a reply to a commanded operation that was accompanied by a permit, the operations logic determines at step 134 whether the receipt corresponds to a permit that was generated by the permit issuing agent 24. For this purpose, the operations logic 124 of the response checking agent and the operations logic 24 of the permit issuing agent communicate with one another. When the permit issuing agent 22 generates a permit, it can provide a copy of that permit to the response checking agent, which keeps a list of all outstanding permits. At step 134, the response checking agent determines whether the receipt corresponds to an outstanding permit on the list. If so, at step 136 the operations logic 124 accesses appropriate business logic associated with the operation(s) identified in the permit, to determine if information in the receipt meets certain conditions. For instance, if the commanded operation was to change the output voltage of a transformer, the business logic can determine if the amount of change reflected in the receipt is within a defined range. If all of the appropriate conditions are met at step 137, the operations logic can remove the corresponding permit from the list of outstanding permits, at step 138.

If the message is not authenticated at step 131, or if the receipt does not correspond to an outstanding permit at step 134, or if values in the receipt do not meet all of the required conditions set forth in the business logic at step 137, a warning is issued at step 140. This warning can be provided to the device management application 22, or to another application in accordance with the business logic.

In addition to receipts that are returned in response to a permit or other commanded operation, a device may transmit messages on its own. For instance, certain types of devices may be configured to detect abnormal conditions, and generate an alert message when such a situation occurs. As an example, when a power outage occurs, a meter or its associated communications module may broadcast a "last gasp" message to notify the back office of the outage in its area. Likewise, a transformer may generate an alert if its temperature rises above a certain threshold. When these types of messages are received, they are also forwarded to the response checking agent 122, to assess their validity. If the received message is determined not to be a signed receipt at step 132, the operations logic 124 accesses one or more business logic modules that are associated with messages that originate from a device, at step 142. If the content of the message complies with the policies encoded in the business logic, as determined at step 144, the message can be forwarded at step 146 to an appropriate application that acts on the message, e.g. an outage management system.

If the message does not comply with the business logic policies, a policy enforcement module can block the alert messages at step 148, rather than forward them to the application that normally handles them. In addition, at step 150 it may send a warning message to a different application in the back office, e.g. an anomaly detection unit. For example, one module associated with device-originated messages may be a rate checking module. If too many alert messages originate from a given device or region within a certain period of time, it may be a sign of tampering. In that case, the messages are blocked at step 148, and a warning is sent at step 150.

From the foregoing, it can be seen that the disclosed permitting system provides secure end-to-end authorization and authentication of commands that are issued to devices in a system. Since the permit issuing agent at the back office confirms compliance with all applicable business logic policies, both with respect to the authorization of any commanded operation and authentication of the command issuer, the endpoint devices are relieved of the need to implement individual policies. They only need to know whether a particular operation requires a permit, and if so whether the permit is authentic and valid.

Moreover, by implementing different sets of policies in respective business logic modules that interface with operations logic, the flexibility and scalability of the permitting system is enhanced. Individual policies can be upgraded without the need to revamp the entire set of policies. In addition, new policies can be added, and outdated policies removed, with little effort. The operations logic provides a uniform interface to all applications that may need to request permits, so that individual applications do not need to be familiar with the policies that are applicable to them.

It will be appreciated by those of ordinary skill in the art that the disclosed concepts can be embodied in other specific forms without departing from the spirit or essential characteristics thereof. For instance, in the preceding embodiments, a single permit is issued for an operation, or group of operations, to be performed by a device. In some cases, however, more than one permit may be required for certain operations. For example, the internal policy of a device may require that a sensitive operation be authorized by two or more entities before it can be carried out. In such a case, a separate permit may be required from each such authorizing entity before the operation is performed.

The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. A method for controlling devices in a system, comprising:
generating a command for an operation to be carried out by a device in the network;
forwarding the command to a permit issuing agent that has access to a plurality of business logic modules stored in a memory, wherein each business logic module has a respectively different set of business rules associated with it;
within the permit issuing agent, performing the following operations by a programmed processor:
based upon at least one attribute of the command, identifying at least one of a plurality of business logic modules that is pertinent to the command;
for each business logic module that is identified as being pertinent to the command, determining whether the command complies with the business rules associated with that module;
if the command is determined to comply with the business rules of all of the identified business logic modules, issuing a permit for the command, wherein the permit is an object having an authenticable attribute, and contains a description of the commanded operation and an identification of a device designated to perform the commanded operation; and
sending the permit for the command to at least one device in the system, for execution of the command.

2. The method of claim 1, further including the step of:
performing a cryptographic operation on the permit using a key stored in a hardware security module associated with the permit issuing agent, prior to transmitting the permit to at least one device in the system.

3. The method of claim 2, wherein the cryptographic operation comprises signing the permit.

4. The method of claim 1, wherein the attribute comprises an operation that is to be performed in accordance with the command.

5. The method of claim 1, wherein each device has an associated type, and the attribute comprises the type of the device to which the command is to be sent.

6. The method of claim 1, wherein a plurality of devices are classified into groups, and the attribute comprises the group to which the device belongs.

7. The method of claim 1, further comprising:
receiving a signed receipt pertaining to the transmitted permit;
verifying whether the signed receipt is associated with the device to which the permit was transmitted; and
verifying whether the command was properly executed.

8. The method of claim 7, wherein the signed receipt comprises information that is derived from the permit, and that is signed in accordance with a key associated with the device that executed the command.

9. The method of claim 8, wherein the signed receipt further comprises information that was added by the device, which information pertains to the execution of the command.

10. The method of claim 7, wherein the receipt is signed by the device that executed the command.

11. The method of claim 7, wherein the receipt is signed by a communications module associated with the device that executed the command.

12. An system for authorizing operations performed by devices, comprising:
a permit issuing agent including:
accessible memory having one or more business logic modules stored therein, each business logic module having a respectively different set of business rules associated with it,
a processor that is configured to implement operations logic that (i) receives a command to be issued to a device, (ii) identifies, in accordance with an attribute of the command, one or more of the business logic modules that are pertinent to the received command, (iii) determines whether the command complies with the business rules associated with each identified module, and (iv) issues a permit if the command complies with the business rules of all of the identified modules, wherein the permit is an object having an authenticable attribute, and contains a description of the commanded operation and an identification of a device designated to perform the commanded operation, and
a security module that stores credentials and performs at least one of a cryptographic operation and an authentication operation on the permit; and
a communication interface configured to transmit the permit to a device.

13. The authorization system of claim 12, wherein the operations logic is implemented within the security module.

14. The authorization system of claim 12, wherein the operations logic is implemented in a device that is separate from the security module, and that communicates with the security module.

15. The authorization system of claim 12, wherein the business logic modules are implemented within the security module.

16. The authorization system of claim 12, wherein the business logic modules are implemented in at least one device that is separate from the security module, and that communicates with the security module.

17. The authorization system of claim 12, wherein at least some of the business logic modules comprises plug-ins to the operations logic.

18. The authorization system of claim 12, wherein the operations logic identifies the one or more of the plurality business logic modules that are pertinent to the received command contains in accordance with a configuration table that associates each command with one or more of the business logic modules.

19. The authorization system of claim 12, wherein the security module is a hardware device.

20. The authorization system of claim 12, wherein the communication interface is a network interface.

21. A non-transitory computer-readable storage medium encoded with a program which, when executed, causes a computer to execute the following operations in response to receipt of a command for an operation to be carried out by a device:
based upon at least one attribute of the command, identify at least one of a plurality of business logic modules that is pertinent to the command, wherein each business logic module has a respectively different set of business rules associated with it;

for each business logic module that is identified as being pertinent to the command, determine whether the command complies with the business rules associated with that module;

if the command is determined to comply with the business rules of all of the identified business logic modules, issue a permit for the command, wherein the permit is an object having an authenticable attribute, and contains a description of the commanded operation and an identification of a device designated to perform the commanded operation;

performing a cryptographic operation on the permit using a key stored in a security module; and after performing the cryptographic operation, forward the permit for the command to at least one device, for execution of the command.

22. The non-transitory computer-readable storage medium of claim 21, wherein the cryptographic operation comprises signing the permit.

23. The non-transitory computer-readable storage medium of claim 21, wherein the attribute comprises an operation that is to be performed in accordance with the command.

24. The non-transitory computer-readable storage medium of claim 21, wherein the program causes the computer to execute the further operations of:
receiving a signed receipt pertaining to the transmitted permit;
verifying whether the signed receipt is associated with the device to which the permit was transmitted; and verifying whether the command was properly executed.

25. The non-transitory computer-readable storage medium of claim 21, wherein the signed receipt comprises information that is derived from the permit, and that is signed in accordance with a key associated with the device that executed the command.

26. The non-transitory computer-readable storage medium of claim 25, wherein the signed receipt further comprises information that was added by the device, which information pertains to the execution of the command.

* * * * *